United States Patent [19]

Bauer

[11] 4,372,984

[45] Feb. 8, 1983

[54] PROCESS FOR IMPROVING THE CONSISTENCY OF A RECONSTITUTED INSTANT PUREE

[75] Inventor: Heinz Bauer, Dinhard, Switzerland

[73] Assignee: Societe D'Assistance Technique Pour Produits Nestle S.A., Lausanne, Switzerland

[21] Appl. No.: 376,671

[22] Filed: May 10, 1982

Related U.S. Application Data

[63] Continuation of Ser. No. 2,853, Jan. 12, 1979, abandoned.

[30] Foreign Application Priority Data

Feb. 6, 1978 [CH] Switzerland .................... 1263/78

[51] Int. Cl.³ .............................................. A23L 1/212
[52] U.S. Cl. .................................... 426/637; 426/452; 426/557; 426/589; 426/629
[58] Field of Search ............... 426/402, 531, 452, 519, 426/557, 589, 629, 637, 646

[56] References Cited

U.S. PATENT DOCUMENTS 3,468,673  9/1969  Keller ................................. 99/100
4,160,849  7/1979  Huchette et al. ............. 426/637 X

FOREIGN PATENT DOCUMENTS 2313176  9/1973  Fed. Rep. of Germany ...... 426/637
561549  8/1977  U.S.S.R. .............................. 426/637

Primary Examiner—Arthur D. Kellogg
Attorney, Agent, or Firm—Vogt & O'Donnell

[57] ABSTRACT

The invention relates to a process for improving the consistency of a reconstituted instant puree. In this process, crude vegetable fibres, such as fibres of tubers, cereals or fruits are incorporated in an instant puree, for example a potato, carrot or split pea puree, in quantities of at most 10% by dry weight of fibres, based on the dry matter content of the puree.

11 Claims, No Drawings

PROCESS FOR IMPROVING THE CONSISTENCY OF A RECONSTITUTED INSTANT PUREE

This is a continuation of application Ser. No. 2,853, filed Jan. 12, 1979, now abandoned.

This invention relates to a process for improving the consistency of a reconstituted instant puree. The invention also relates to the instant purees thus obtained.

One of the major difficulties encountered in the instant puree industry is attributable to the significant variations which the starting material, for example potatoes, can show. As a result of these variations, which are attributable to botanical, climatic or seasonal factors, it is particularly difficult and tricky, at least on an industrial level, to produce an instant puree which, on reconstitution, is able to guarantee a constant and predetermined consistency.

In the same way as, for example, the various varieties of potato are not all suitable for the production of quality chips, neither do they all readily lend themselves to the production of a quality instant potato puree in the form of flakes or granules.

A principal object of the present invention is to obviate these disadvantages.

The invention provides a process for improving the consistency of a reconstituted instant puree which comprises incorporating crude vegetable fibres in the instant puree in a quantity of at most 10% by dry weight of fibres, based on the dry matter content of the puree.

In the context of the invention, an "instant puree" of potatoes, carrots, split peas, etc., is understood to be an industrial product which is generally in the form of flakes or granules and which normally has a residual moisture content of from 5 to 8%.

The vegetable fibres used may be defined on three levels, namely physical (cellular), chemical and technological. First of all, they are defined as constituting the cell walls of vegetable materials. Chemically, they are characterised as being mixtures of various polymeric substances, such as cellulose, hemicelluloses, pectins, lignins. A typical composition corresponds to 50 to 80% of cellulose, 5 to 35% of lignin, 10 to 40% of hemicelluloses and pectins and 5 to 10% of water. These vegetable fibres are normally residues emanating from numerous and various industries. In starch or potato-starch factories, they are obtained as by-products from the washing of potatoes for extracting starch therefrom. In the carrot juice industry, they are present in large quantities in the pressing residues.

In the context of the invention, "crude vegetable fibres" are understood to be the fibres obtained primarily in the above mentioned industries without any refining treatment other than straightforward washing.

Accordingly, the fibres used may be fibres of tubers, such as potatoes and carrots, fibres of cereals, such as wheat, corn, bran, fibres of fruits, such as apples, plums.

The fibrous structure is essential to the consistency of the puree obtained. Comparison tests have shown that the use in corresponding quantities of chemically related materials without a fibrous structure does not produce the required effect on consistency. For example, neither pure cellulose nor microcrystalline cellulose is suitable.

The crude vegetable fibres have to be incorporated in quantities not exceeding 10% by dry weight of fibres, based on the dry matter content of the puree, and preferably in quantities of from 1 to 5%. Taking their chemical composition into account, these quantities correspond to percentages of cellulose of, on average, less than 5% and, preferably, from 0.5 to 4%. It should be pointed out at this juncture that it has already been recommended to use vegetable fibres in food products, particularly potato puree, in distinctly larger quantities and, in any case, in quantities of more than 10% for preparing a dietetic, i.e. low-calorie, instant potato puree. Quite apart from the fact that it may legitimately be asked whether a potato puree having a fibre content of 50% for example is still entitled to be called a "potato puree," it has been found that the incorporation of quantities such as these gives rise to strange, even unpleasant, tastes. In addition, the effect on consistency is above all significant with small additions and, in this respect, nothing is gained by adding quantities of larger than 10%.

The crude vegetable fibres may be incorporated in the instant puree in various ways. Thus, the instant puree, in the form of flakes or granules, and the crude vegetable fibres may simply be dry-mixed. In this case, prolonged mixing is desirable for obtaining a homogeneous mixture. This method of incorporation is particularly advantageous when the instant puree is in the form of granules. Incorporation may also be carried out before drying of the puree when it is still in the form of a paste and has a dry matter content of from 18 to 26%. This variant is suitable both for flake puree and for granular puree. In this case, the fibres may be introduced in dry form or even in the form of a broth (suspension in water, for example containing 60% of water).

As mentioned above, it is possible by the process according to the invention to standardise to a fixed value the consistency of a reconstituted instant puree, i.e. an instant puree converted back into paste form by the addition of water or milk, as well known. The process according to the invention also enables the required consistency to be quaranteed even if the puree is prepared from potatoes which, by their very nature, would be unsuitable for the production of a high-quality puree.

In one preferred embodiment of the process according to the invention, there is prepared an instant puree to which from 1 to 5% of crude vegetable fibres, such as potato fibres or carrot fibres, are added either before drying, for example on rollers, or by dry mixing. Under these conditions, increases in consistency of up to 70% (as measured with a Brabender) are readily obtained in a potato puree obtained from the Bintje variety and reconstituted with water in a quantity of 750 milliliters for 115 g of potato flakes or 150 g of potato granules. The instant puree may of course be put to various uses. For example, it may be eaten as such after reconstitution or may be used for the preparation of croquettes, dauphine potatoes, cottage pie, fried potatoes, etc.

The process according to the invention is illustrated by the following Examples in which the percentages quoted represent % by weight.

EXAMPLES

Preparation of the crude fibres

The crude potato fibres are prepared from residues emanating from Vilands Starkelsefabrik, Backaskog, Kristianstad, a Swedish starch manufacturer. These residues are first disintegrated by suspension in water and treatment in a Supraton D 305 mill until particles ranging from 0.1 to 0.5 mm in size are obtained. The "broth" obtained is then passed through a 0.125 mmmesh Alfa-Laval GL screen. This operation is repeated twice. The product freed from the fines is again taken up in water, sterilised by the injection of steam for 30 minutes at 100° C., cooled to 20° C. in an Alfa-Laval Con-Therm scraped-surface heat exchanger and squeezed dry on an Alfa-Laval GL screen. In this case, the crude fibres are obtained by drying on rollers. If storage is necessary, the squeeze-dried product is frozen at −20° C. in the form of 50×20 mm blocks. These blocks are thawed and dried just before the fibres are used. The fibres thus obtained are used in Examples 1 to 6, 9 to 13 and 27 to 33 and in the associated Comparison Examples.

Commercial potato fibres (Avebe P.P.C., Vandam, Netherlands) are used in Examples 7 and 8.

The crude carrot fibres are prepared in the same way as the potato fibres from pressing residue emanating from Findus, Bjuv, Sweden, a carrot juice manufacturer.

The bran was supplied by the Marten Perssons Company of Valskvam, Sweden. The washed bran used in Examples 20 to 22 was supplied by the same company, but was washed three times with water.

The corn fibres were supplied by Corn Products Corp.

Method of incorporation of the crude fibres

Either by dry mixing (D in the Table) or by wet mixing (W in the Table), i.e. during production of the granules or flakes just before drying. In Examples 9 and 10 and 26 to 33, the fibres are added as such. In Examples 1 to 3, 7 and 8 and 11 to 25, they are added in the form of a broth, i.e. suspended in water, the dry matter content of this broth being of the order of 40%.

In Examples 11 to 13, the potatoes used for production of the instant puree are of the Prominent variety. In all the other examples of potato puree, the potatoes used are of the Bintje variety.

Increases in consistency

The increases in consistency are measured by means of a Brabender in relation to a reference sample with no crude fibres added.

The results are set out in the following Table.

| Example No. | Nature and form of the instant puree f = flakes g = granules | Materials of the crude fibres incorporated | Total amount of fibres incorporated in % | Method of incorporation | Increase in consistency in the re-constituted puree in % |
|---|---|---|---|---|---|
| 1 | g potato | potato | 2.5 | W | 27.9 |
| 2 | " | " | 5 | W | 40.7 |
| 3 | " | " | 10 | W | 47.6 |
| 4 | " | " | 2.5 | D | 22.1 |
| 5 | " | " | 5 | D | 36.3 |
| 6 | " | " | 10 | D | 42.5 |
| 7 | f. potato | " | 4.5 | W | 20.1 |
| 8 | " | " | 9 | W | 29.3 |
| 9 | " | " | 7.5 | W | 16.4 |
| 10 | " | " | 10 | W | 31.8 |
| 11 | " | " | 2.5 | W | 18.2 |
| 12 | " | " | 5 | W | 15.9 |
| 13 | " | " | 10 | W | 69.3 |
| 14 | " | carrot | 1.25 | W | 2.8 |
| 15 | " | " | 2.5 | W | 13.2 |
| 16 | " | " | 5 | W | 7.5 |
| 17 | " | bran | 1.25 | W | 9.3 |
| 18 | " | " | 2.5 | W | 3.1 |
| 19 | " | " | 5 | W | 5.2 |
| 20 | " | washed bran | 1.25 | W | 13.9 |
| 21 | " | " | 2.5 | W | 18.9 |
| 22 | " | " | 5 | W | 14.5 |
| 23 | " | corn | 1.25 | W | 12.2 |
| 24 | " | " | 2 | W | 15.6 |
| 25 | " | " | 5 | W | 15.6 |
| 26 | f. carrot | carrot | 7.5 | W | 15 |
| 27 | " | potato | 1.5 | W | 5 |
| 28 | " | " | 2.7 | W | 35 |
| 29 | " | " | 4 | W | 60 |
| 30 | f. carrot potato 2/1 | " | 1 | W | 16 |
| 31 | " | " | 2 | W | 21 |
| 32 | " | " | 3.6 | W | 42 |
| 33 | " | " | 5.4 | W | 60 |

Comparison Examples (a) The procedure is as described in Example 12, 25% of crude potato fibres being incorporated in the flake-form potato puree. After reconstitution, the puree obtained in this way shows an increase in consistency of 17% in relation to a reference puree. Accordingly, the increase in consistency is not significantly higher than that obtained with an addition of only 5%.

Above all, an adverse effect upon taste is observed at this high level of incorporation. The reconstituted puree has an "abnormal" taste.

(b) The procedure is as described in Example 16, 15% of carrot fibres being incorporated in the flake-form potato puree. The increase in consistency is negligible, from which it has to be concluded that the optimum is situated at around 2.5%, as in Example 15.

A very adverse effect upon taste is also observed with this 15% addition.

(c) The procedure is as described in Example 12, using 5% of carboxymethyl cellulose instead of the same quantity of potato fibres. Incorporation is carried out by wet mixing, the carboxymethyl cellulose powder being added as such.

On reconstitution, a puree is obtained which, although showing an improvement in consistency of 43.9% in relation to a reference sample with no carboxymethyl cellulose added, is extremely glutinous and unacceptable.

(d) The procedure is as described in Example 12, using 5% of methyl cellulose powder incorporated by wet mixing.

After reconstitution, the puree obtained does not show any increase in consistency in relation to a reference sample with no methyl cellulose added.

(e) The procedure is as described in Example 12, using 5% of microcrystalline cellulose powder incorporated by wet mixing.

After reconstitution, the puree obtained has a consistency reduced by 2% in relation to a reference sample with no microcrystalline cellulose added.

I claim:

1. A process for treating a reconstitutable instant potato puree so as to improve its consistency upon reconstitution which consists of incorporating in the unreconstituted instant potato puree a material consisting of crude vegetable fibres in a quantity of from 1 to 5% by dry weight, based on the dry matter content of the puree.

2. A process as claimed in claim 1, wherein crude vegetable fibres are incorporated in quantities corresponding to from 0.5 to 4% of cellulose.

3. A process as claimed in claim 1, wherein the crude vegetable fibres are fibres of tubers, cereals or fruits.

4. A process as claimed in claim 3, wherein the crude vegetable fibres are potato fibres, carrot fibres, corn fibres or bran.

5. A process as claimed in claim 1, wherein the instant puree is a granular or flake puree.

6. A process as claimed in claim 1, wherein the crude vegetable fibres are incorporated in the instant puree by dry mixing.

7. A reconstitutable instant potato puree having improved consistency upon reconstitution obtained by the process of claim 1.

8. A reconstitutable instant potato puree having improved consistency upon reconstitution which consists of (a) reconstitutable potato puree and (b) from 1 to 5% by dry weight of crude vegetable fibres, based on the dry matter content of the instant potato puree, added to the puree.

9. The product of claim 8, wherein the crude vegetable fibres are fibres of tubers, cereals or fruits.

10. The product of claim 9, wherein the crude vegetable fibres are potato fibres, carrot fibres, corn fibres or bran.

11. The product of claim 8, wherein the instant puree is a granular or flake puree.

* * * * *